United States Patent [19]

Greiner et al.

[11] Patent Number: 4,786,030

[45] Date of Patent: Nov. 22, 1988

[54] ELECTROMAGNETICALLY ACTUATABLE FUEL INJECTION VALVE

[75] Inventors: Max Greiner, Gerlingen; Udo Hafner, Lorch; Waldemar Hans, Bamberg; Heinrich Knapp, Leonberg; Wolfgang Kramer, Kemmern; Rudolf Krauss, Stuttgart; Ferdinand Reiter, Markgroningen; Peter Romann, Stuttgart; Rudolf Sauer, Benningen, all of Fed. Rep. of Germany

[73] Assignee: Robert Bosch GmbH, Stuttgart, Fed. Rep. of Germany

[21] Appl. No.: 124,528

[22] Filed: Nov. 24, 1987

[30] Foreign Application Priority Data

Dec. 4, 1986 [DE] Fed. Rep. of Germany ....... 3641469

[51] Int. Cl.[4] ........................ F16K 31/08; F02M 51/06

[52] U.S. Cl. .................................. 251/129.15; 251/65

[58] Field of Search ............................. 251/65, 129.15; 239/452, 584, 585

[56] References Cited

U.S. PATENT DOCUMENTS 4,597,558 7/1986 Hafner et al. .................. 251/129.15

4,653,720 3/1987 Knapp et al. .

*Primary Examiner*—Arnold Rosenthal

*Attorney, Agent, or Firm*—Edwin E. Greigg

[57] ABSTRACT

An electromagnetically actuatable fuel injection valve which serves to supply fuel to a mixture-compressing internal combustion engine having externally supplied ignition. The fuel injection valve includes a valve housing with a mouth piece, in which a valve seat body is disposed, included are two magnet coils two cores and one armature, which has a spherical guide section and the later is being connected to a valve needle. The spherical guide section is slidably supported with its circumference in a guide bore of the valve seat body and in its stroke movement away from the core is limited by a tapering stop opening which adjoins the guide bore. Flat faces are provided on the circumference of the spherical guide section, such that they decrease the area of contact between the spherical contact section and the stop opening.

6 Claims, 1 Drawing Sheet

ELECTROMAGNETICALLY ACTUATABLE FUEL INJECTION VALVE

BACKGROUND OF THE INVENTION

The invention is based on an electromagnetically actuatable fuel injection valve as defined hereinafter. A fuel injection valve is already known in which the armature has a spherical guide section so that when the valve is opened it comes to rest with one contact face on a stop opening. This has the disadvantage that when the fuel injection valve closes, there is an undesirably strong tendency to hydraulic and magnetic adhesion at the annular contact face, leading to an undesirable delay in the closing movement.

OBJECT AND SUMMARY OF THE INVENTION

The electromagnetically actuatable fuel injection valve has the advantage over the prior art that by decreasing the area of the contact face between the spherical guide section and the stop opening, hydraulic and magnetic adhesion is also decreased, so that the closure of the fuel injection valve is faster and more precise.

Further improvements to the fuel injection valve defined by the main claim are attainable by the refinements disclosed herein. It is advantageous to embody the armature and the spherical guide section as a single part in the form of a spherical zone, so that this part can be made as one workpiece in a single operation.

It is also advantageous for the armature and spherical guide section to be embodied in two parts, which in that case can be made from suitable materials and afterward joined firmly to one another. The armature can then be made from a good soft magnetic material, while the spherical guide section, which is vulnerable to wear, can be made from a hard material.

The invention will be better understood and further objects and advantages thereof will become more apparent from the ensuring detailed description of preferred embodiments taken in conjunction with the drawings.

DESCRIPTION OF THE PREFERRED EMBODIMENTS

Figure 1:
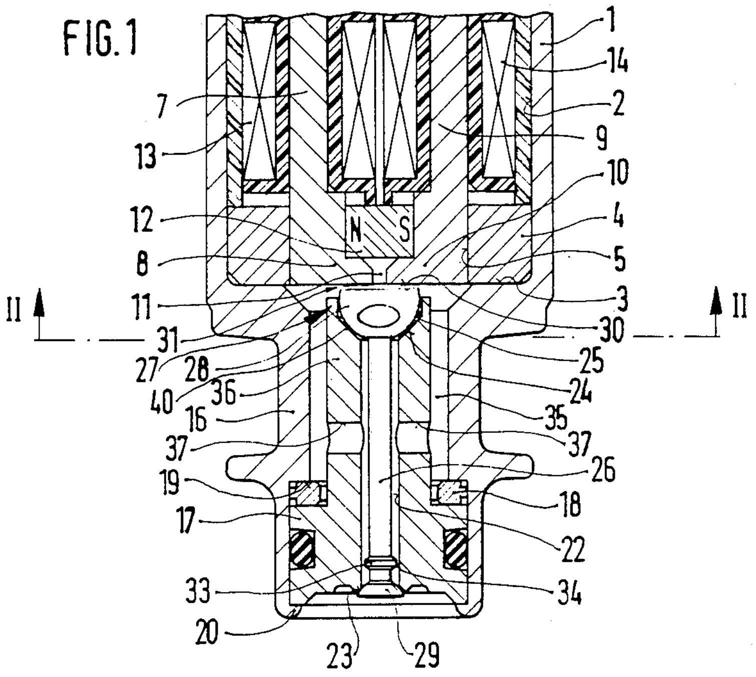
FIG. 1 shows a first exemplary embodiment of a fuel injection valve embodied in accordance with the invention.

The fuel injection valve shown in FIG. 1, for a fuel injection system of a mixture-compressing internal combuation engine having externally supplied ignition, has a valve housing 1, the stepped inner housing bore 2 of which has a first shoulder 3, on which a base plate 4 rests. Protruding into the central recess 5 of the base plate 4 are a first pole piece 7 having a first bent pole 8 and a second pole piece 9 having a second bent pole 10. Between themselves, the poles 8 and 10, oriented toward one another, form a pole air gap 11, which is spanned in part by a permanent magnet 12. Inside the inner housing bore 2, a first magnet coil 13 is disposed on the first pole piece 7 and a second magnet coil 14 is disposed on the second pole piece 9, the coils being located above the poles 8, 10.

Adjacent to the region receiving the magnet coils, the valve housing 1 has a mouth piece 16 of smaller diameter with which the inner housing bore 2 is coextensive and which receives a valve seat body 17, which rests via a shim 18 on a second shoulder 19 of the inner housing bore 2. The rim of the mouth piece 16, in a flanged over portion 20, partly surrounds the valve seat body 17 and presses it toward the second shoulder 19 against the shim 18. In the axial direction, the valve seat body 17 has a through flow bore 22, which discharges outward into a fixed valve seat 23 embodied on the valve seat body 17. Remote from the valve seat 23, the flow bore 22 merges with an oblique stop opening 24, the diameter of which increases in conical fashion up to an adjoining cylindrical guide bore 25. A valve needle 26 passes with play through the flow bore 22, and an armature 27 of ferromagnetic material is fixed on one end of the valve needle 26, the armature 27 being formed as a spherical guide section which is joined to the valve needle 26, the arrangement being such that the spherically embodied guide section 28 is slidably supported in the guide bore 25 with little radial play. Remote from the armature 27, a closing head 29 is embodied on the valve needle 26, and arranged to cooperate with the valve seat 23. The armature has a flattened portion 30 oriented toward the pole pieces 7, 9 acting as a core, and when the magnet coils 13, 4 are not excited, the armature 27 is attracted toward the poles 8, 10 by the permanent magnetic field of the permanent magnet 12, but an air gap 31 remains between the armature and the poles when the closing head 29 is resting on the valve seat 23. In this position, the spherical guide section 28 has lifted away from the stop opening 24. The radial guidance of the spherical guide section 28 and hence of the armature 28 is effected on the circumference of the guide section, by virtually line contact in the guide bore 25. Directly upstream of the closing head 29, a metering collar 33 is embodied on the valve needle 25, acting with the wall of the flow bore 22 as a throttle restriction for the fuel and forming an annular metering gap 34, at which for example approximately 70% of the fuel pressure, relative to the ambient pressure prevailing downstream of the valve seat 23, drops. The remaining 30% of the fuel pressure relative to the ambient pressure drops at the flow cross section between the valve seat 23 and the closing head 29. Disposing the annular metering gap 34 directly upstream of the valve seat 23 has the advantage that the fuel metering takes place at a location at which the annular metering gap does not become plugged with components of the intake tube atmosphere, such as superfine dust and particles from recirculated exhaust gas, which would cause the metered fuel quantity to vary during operation. The delivery of fuel to the flow bore 22 is effected in an annular conduit 35 between the perforated tubular portion 36 of the valve seat body 17 and the inner housing bore 2, which leads to a fuel delivery connection, not shown, of a fuel feed pump, on the one hand; and, on the other hand, the radial bores 37 which lead from the inner bore 2 to the flow bore 22.

As already explained, when the magnet coils 13, 14 are not excited, the armature 27 is attracted by the permanent magnetic field 12 toward the poles 8, 10, thus retaining the closing head 29 on the valve seat 23. Upon excitation of the magnet coils 13, 14, the permanent magnetic flux at the armature 27 is countered by an approximately equal electromagnetic flux, so that the pressure of the fuel engaging the valve needle in the opening direction of the valve is sufficient to lift the closing head 29 from the valve seat 23, and the arature 27 can execute a stroke movement until the guide section 28 comes to rest on the wall of the stop opening 24. The stroke movement of the armature 27 or of the closing head 29 relative to the valve seat 23 can be adjusted in a known manner prior to the mounting of the armature 27 or guide section 28 on the valve needle 26. When the closing head 29 has lifted outward away from the valve seat 23, the fuel flowing to the valve seat 23 at the same time centers the valve needle 26 in the flow bore 22.

Figure 2:
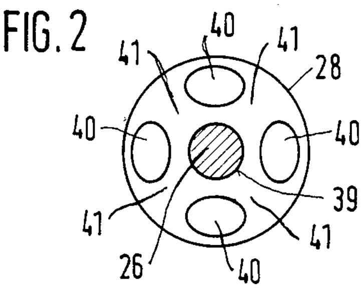
FIG. 2 is a section taken along the line II—II of FIG. 1 in the form of a view from below of the armature according to the invention, which has a spherical guide section.
Figure 3:
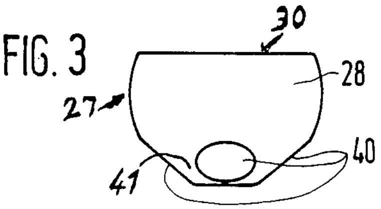
FIG. 3 is a side view of the armature according to the invention having a spherical guide section.

As shown on a larger scale in FIGS. 2 and 3, the armature 27 and the spherical guide section 28 are embodied as one part, in the form of a spherical zone. One end of the valve needle 26 is inserted into a central bore 39 of the armature and secured, for instance by wedging, welding, or other means. The surfaces of the armature 27 and guide section 28 can be provided with a wear-resistant coating, for example of nickel, titanium nitride, or other materials. According to the invention, at least two, and in the exemplary embodiment four, flat faces [40], spaced apart from one another by equal intervals, are provided on the circumference of the spherical guide section 28 in such a manner that when the spherical guide section 28 rests on the stop opening 23, these faces decrease the resulting contact surface area between the spherical guide section 28 and the stop opening 24, because this contact surface intersects the faces 40, so that the guide section 28 now comes to rest on the stop opening 24 only with partial faces 41 located between the faces 40. Because of the decrease in this contact surface area between the spherical guide section 28 and the stop opening 24, the tendency toward hydraulic and magnetic adhesion is considerably reduced, and as a result the closure of the fuel injection valve takes place faster and more accurately.

Figure 4:
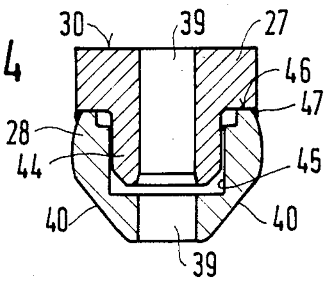
FIG. 4 shows a second exemplary embodiment according to the invention of an armature having a spherical guide section.

In the second exemplary embodiment shown in FIG. 4, elements that remain the same as those in FIGS. 1–3 and have the same function are identified by the same reference numerals. Deviating from the first exemplary embodiment, the armature 27 and the spherical guide section 28 here are embodied as two parts. the cylindrical armature 27 is made of soft magnetic material and has an extension 44 of lesser diameter, with which it protrudes into a receiving bore 45 of the guide section 28, which is made of a hard material. The central bore 29 for receiving the valve needle 26 penetrates both the armature 27 and the guide section 28. The armature 27 is seated on the end face 46 of the guide section 28 adjacent to the valve needle, and on this end face 46 it is firmly joined to the guide section 28 at 47, for example by laser welding.

Figure 5:
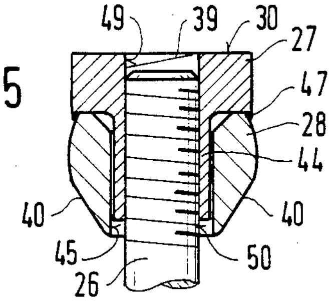
FIG. 5 shows a third exemplary embodiment according to the invention of an armature having a spherical guide section.

In the third exemplary embodiment shown in FIG. 5, in which once again the same reference numerals have been used for elements having the same function, the armature 27 and guide section 28 are again embodied as two parts, the armature 27 being made of soft magnetic material and the guide section 28 of a hard material. The extension 44 of the armature 27 is inserted into the receiving bore 45 that penetrates the guide section 28, and the armature 27 and guide section 28 are welded together at 47. The central bore 39 penetrating the armature 27 is provided with an internal thread 49, into which the valve needle 26 is screwed with an external thread 50 and fixed firmly therein once the final position has been set. In the exemplary embodiments according to FIGS. 4 and 5, the guide section 28 is again, as described in conjunction with FIGS. 1–3, provided with faces 40, which are distributed uniformly over the circumference and which, when the guide section 28 is resting on the stop opening 24, decrease the contact surface area between the guide section 28 and the stop opening 24.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. An electromagnetically actuatable fuel injection valve having a valve housing, a valve seat body disposed in the valve housing, at least one magnet coil, a core and an armature interposed betwen said housing and said valve seat body, the armature being connected to a spherical guide section which carries a valve needle, the circumferences of which spherical guide section is slidably supported in a guide bore of the valve seat body and the stroke movement of which spherical guide section in the direction away from the core can be limited by means of a stop opening which adjoins the guide bore and is aranged to taper progressively from the guid bore on, at least two flat faces (40) spaced apart equally from one another on the circumference of the spherical guide section (28), whereby when the spherical guide section (38) is resting on the stop opening (24) said flat faces decrease the contact surface area between the spherical guide section (28) and the stop opening (24).

2. A fuel injection valve as defined by claim 1, in which the armature (27) and the spherical guide section (28) comprise a spherical zone.

3. A fuel injection valve as defined by claim 2, in which the surfaces of the armature (27) and guide section (28) are provided with a wear-resistant layer.

4. A fuel injection valve as defined by claim 1, in which the armature (27) is made of soft magnetic material which protrudes with an extension (44) into a receiving bore (45) of the guide section (28) which is made of a hard material, and said extension being firmly joined to the guide section (28).

5. A fuel injection valve as defined by claim 4, in which the armature (27) has a central bore (39), and one end of the valve needle (26) is secured therein.

6. A fuel injection valve as defined by claim 5, in which the central bore (39) of the armature has an internal thread (49), and the valve needle (26) is provided with an external thread (50) which is received in the central bore (39).

* * * * *